Patented Dec. 22, 1942

2,305,602

UNITED STATES PATENT OFFICE 2,305,602

UNSATURATED COMPOUNDS CONTAINING A STEROL NUCLEUS

Adolf Butenandt, Danzig-Langfuhr, Freestate Danzig, assignor to Schering Corporation, Bloomfield, N. J., a corporation of New Jersey No Drawing. Application November 2, 1936, Serial No. 108,808. In Germany November 5, 1935

6 Claims. (Cl. 260—397.3)

This invention relates to compounds containing a sterol nucleus and more particularly to unsaturated compounds containing a sterol nucleus, and a method of producing the same.

One object of this invention is to introduce double bonds into the 1,2-position of such sterol compounds so as to produce $\Delta^{1,2}$-ketones of the sterol series.

Among compounds of sterol-like constitution are to be understood such compounds to which the following general constitutional formula can be ascribed:

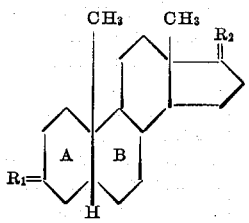

In this formula $R_1$ stands for hydrogen and a hydroxyl group or for oxygen and $R_2$ for any saturated or unsaturated hydrocarbon residue containing or free from oxygen and for hydrogen, or for an $R_3$ group and for hydrogen, or for an $R_3$ group and for a hydrocarbon residue, or for oxygen, wherein $R_3$ indicates a hydroxyl group or a group that upon hydrolysis can be reconverted into a hydroxy group. My invention thus involves compounds which possess a cyclopentano dimethyl polyhydrophenanthrene system and furthermore, in contradistinction to the follicle hormone, contain no aromatic ring. To these belong, for example, the sterols, the bile acids and their homologues together with degradation products, the toxigenines of the saponines, compounds of the pregnane series, as, for example, pregnandiols, the male sex hormones of the androstan series and their isomers or substitution products and also the derivatives of all such compounds and the like.

In order to produce such unsaturated ketones, the keto group of which is on the carbon atom 3 and the double bond between the carbon atoms 1 and 2, from corresponding saturated ketones it is advantageous to proceed in such a manner that the sterol-like ketones are subjected to halogenation and subsequent splitting off of hydrogen halide, in which the rings indicated in the above formula by A and B are linked together in the same manner as in dihydrocholesterol, in the so called trans-position. For, in this case, the halogen atom is introduced on the carbon atom 2 so that in the subsequent halogen hydride splitting the double bond is produced between the carbon atoms 1 and 2. Such a linking of the rings A and B in the trans-position is present, for example, in the male germinal gland hormone androsterone, in trans-androsterone and in cholestanone. In contradistinction thereto, in the isomeric koproandrosterones and in koprostanone the rings A and B are in the cis-position to one another; in this compound the introduction of the halogen favourably takes place on the carbon atom 4 so that on halogen hydride splitting the double bond is formed between the carbon atoms 4 and 5. The introduction of the halogen takes place in known manner, bromine being preferably employed, although the other halogens may also be used. In order finally to split off the halogen hydride the halogenation product is suitably heated with potassium acetate in glacial acetic acid solution for several hours to elevated temperatures. Of course, other known methods for splitting off halogen hydride may be used likewise as is well known to chemists skilled in the art.

If in the starting material available there is not present on the carbon atom 3 a keto group but a hydroxyl group then the material concerned, prior to carrying out the process of the invention, is subjected to a corresponding oxidation treatment.

The degradation of any hydrocarbon residue which may be present in the cyclopentano ring of the sterol-like compounds can take place at any suitable stage of the process according to the invention. This degradation can be effected, for example, by energetic oxidation of the sterol-like compound by means of chromium trioxide (for this compare among others Ruzicka, Helv. chim. Acta 17, 1389, 1934); the side chain can, however, also be removed by systematic methods, such as by means of the so-called Grignard degradation (for this compare, for example, Dalmer, Berichte 68, 1814, 1935).

The following examples illustrate the invention:

Example 1

1 g. of cholestanone (M. P. 128–129°), is dissolved in 40 ccs. of glacial acetic acid and treated with 4 drops of hydrobromic acid-glacial acetic acid and 2.4 ccs. of an acetic acid solution of bromine containing 1.05 mol of bromine (calculated on 1 mol of cholestanone). The reaction solution is decolorised at room temperature after 10 minutes. After 12 hours standing the 2-bromocholestanone crystallises directly from the reaction solution in beautifully formed white needles.

After recrystallisation from chloroform-glacial acetic acid it exhibits a melting point of 169-170° C. Yield: 1.5 grams.

1 gram of the 2-bromocholestanone of M. P. 169-170° C. is thereupon suspended in 30 ccs. of 21% potassium acetate-glacial acetic acid solution and heated for 5 hours at 200° C. in a bomb tube. The reaction product is precipitated with water and taken up with ether. The neutral portions are distilled under 0.001 mm. pressure; at 100-110° C. there sublimes a substance which after repeated recrystallisation from dilute acetone crystallises in beautiful feathery leaflets of M. P. 111-112° C. Yield: 50 mg.

$$[\alpha']^{18}_D = -32.08$$

(in alcohol); absorption maximum at 240 μ.

Example 2

500 mg. of androstandione-(3,17) are dissolved in 10 ccs. of glacial acetic acid and treated with 10 drops of hydrobromic acid-glacial acetic acid and a quantity of bromine-glacial acetic acid solution corresponding to 0.9 mol of bromine. Decolorisation of the bromine solution takes place at once; the reaction product is precipitated with water, filtered off and recrystallised from methanol. From 480 mg. of crude crystallisate there are obtained after several recrystallisations 123 mg. of pure 2-bromoandrostandione. It crystallises in needles of M. P. 213-214° C. with decomposition.

200 mg. of the brominated product are heated with 8 ccs. of a 21% potassium acetate glacial acetic acid solution for 5 hours at 180-200° C. in a bomb tube. After cooling the reaction products are poured into water and extracted with ether. The neutral portions of the ether extract are ground with a little methanol and allowed to stand for some time. In a yield of 10-15% there is then obtained in the form of needles the α-β-unsaturated ketone $\Delta^{1,2}$-androstendione; it exhibits a characteristic absorption maximum at 240 μ.

The $\Delta^1$-androstendione can also be isolated by high vacuum distillation of the neutral portions. By this means there distils between 130 and 140° C. under 0.001 mm. pressure a light oil which on recrystallisation from dilute alcohol yields crystals. On recrystallisation from dilute acetone and dilute alcohol there is obtained therefrom the $\Delta^1$-androstendione in feathery needles of M. P. 139-140°. $[\alpha]^{20}_D = +6.8°$ (in alcohol).

The oxime of this substance is obtained in the following manner:

16 mg. of $\Delta^1$-androstendione are boiled with an alcoholic solution of hydroxylamine acetate (33 mg. hydroxylamine hydrochloride + 50 mg. sodium acetate) for 3 hours on the water bath. The solution is then diluted with water and the crystallised oxide recrystallised from dilute alcohol. It commences to decompose above 225° C. at 252° C. the decomposition is complete.

Example 3

460 mg. of androstanol-17-one-3 are dissolved in 30 ccs. of glacial acetic acid and treated with 10 drops of hydrobromic acid-glacial acetic acid and a solution of 0.9 mol of bromine in glacial acetic acid. The working up takes place as in Example 2 and yields 230 mg. of 2-bromo-androstanol-17-one-3 of M. P. 180-181° C. with decomposition.

The splitting off of the hydrobromic acid and the further working up takes place in the same manner as set forth in Example 2. There is thus obtained in about the same yield the $\Delta^{1,2}$-androstenol-17-one-3 likewise in the form of needles; the α-β-unsaturated ketone exhibits the characteristic absorption maximum at 240 μ.

It is also possible to produce from the 2-bromo-androstanol-17-one-3 the diketone 2-bromo-androstandione-3,17 by allowing 31.3 mg. of 2-bromo-androstanol-17-one-3 to stand for 20 hours with 8.5 mg. of chromium trioxide to effect oxidation of the hydroxyl group. Then the whole is considerably diluted with water and extracted with ether. The ether residue is recrystallised from alcohol; 21.5 mg. of 2-bromo-androstandione of M. P. 213-214° C. with decomposition are obtained in needles. This oxidation product exhibits with the 2-bromo-androstandione prepared above no depression of the melting point. Yield: 69% of the theory. From the oxidation product the $\Delta^1$-androstendione can be produced in accordance with the precedure of Exampde 2.

Of course, many changes and variations may be made in the reaction conditions described in the above given examples. Thus, for instance, instead of cholestanone other saturated or hydrogenated sterol-3-ketones that correspond in their stereo configuration to the structure of cholestanone may be used; likewise instead of androstanol-17-one-3 various 17-alkyl-androstanol-17-one-3 compounds may be employed as starting materials such as are obtained, for instance, by reacting androstanol-17-one-3 compounds with Grignard reagents. Instead of the ketones, also derivatives of the keto group may be employed, for instance, those wherein the keto group of the sterolic ketones and the like is reacted with typical ketone reagents such as semicarbazide, thiosemicarbazide, phenyl hydrazine, hydroxyl amine and the like.

The halogenation of these starting materials may be carried out not only in glacial acetic acid but also in other indifferent organic solvents, such as chloroform, carbon tetrachloride and the like provided the solvents are not substantially affected by halogen.

The separation and isolation of the halogenated intermediate compounds and of the unsaturated products can be accomplished not only in the manner described in the examples by precipitating with water and extracting with ether or by high vacuum distillation, but also by other methods, for instance, by making use of the formation of insoluble or difficultly soluble condensation products as with typical ketone reagents and the like.

The purification of said intermediate and unsaturated products may be done by fractional and/or repeated crystallisation, distillation, sublimation, and the like.

Of course, the amounts of the various agents and the type and the amounts of the solvents used in carrying out this invention, the temperatures employed and the other reaction conditions may be varied within the limits obvious to those skilled in the art; hence, many other changes and variations may be made in accordance with the principles set forth herein and in the claims annexed hereto.

What I claim is:

1. A $\Delta^{1,2}$ unsaturated compound of the cyclopentano polyhydrophenanthrene series of the following structural formula

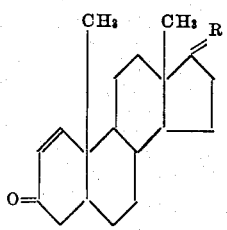

wherein R is a member of the group consisting of

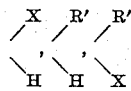

and =O, X being a hydrocarbon radical, while R' is a member of the class consisting of the hydroxy group and groups that on hydrolysis can be replaced by the hydroxy group.

2. $\Delta^{1,2}$-cholestenone-3 of the following structural formula

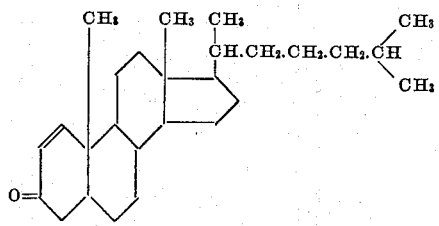

having the melting point of 111–112° C, $[\alpha]^{18}_D = -32.08$ (in acohol) and an absorption maximum at 240 m$\mu$.

3. $\Delta^{1,2}$-androstendione-3,17 of the following structural formula

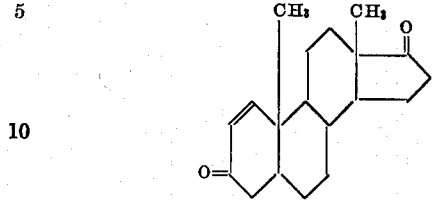

having the melting point of 139–140° C., $[\alpha]^{20°}_D = +6.8°$ (in alcohol), its oxime decomposing between 225 and 252° C.

4. $\Delta^{1,2}$-androstenol-17-one-3 of the following structural formula

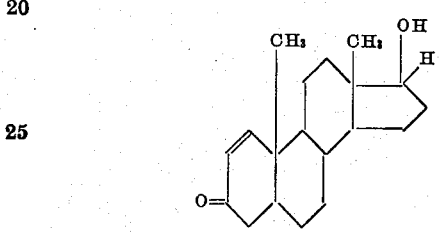

having an absorption maximum at 240 m$\mu$.

5. A $\Delta^1$-androstenone-3-compound having in the 17-position an alkyl and a hydroxyl radical.

6. A $\Delta^1$-3-keto-10,13 dimethyl cyclopentano polyhydro phenanthrene compound.

ADOLF BUTENANDT.